US006183539B1

(12) United States Patent
Rode et al.

(10) Patent No.: US 6,183,539 B1
(45) Date of Patent: *Feb. 6, 2001

(54) MOLECULAR SIEVE ADSORBENT FOR GAS PURIFICATION AND PREPARATION THEREOF

(75) Inventors: Edward J. Rode, Crestwood; Albert M. Tsybulevskiy, Louisville, both of KY (US)

(73) Assignee: Zeochem Co., Louisville, KY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/108,518

(22) Filed: Jul. 1, 1998

(51) Int. Cl.⁷ .................................................. B01D 53/04
(52) U.S. Cl. ................................ 95/117; 95/139; 95/902; 96/108; 502/79
(58) Field of Search .................. 95/117, 139, 902; 96/108; 502/68, 79

(56) References Cited

U.S. PATENT DOCUMENTS

| 2,882,244 | 4/1959 | Milton . |
| 3,078,635 | * 2/1963 | Milton ........................... 95/117 |
| 3,078,639 | 2/1963 | Milton . |
| 3,751,878 | * 8/1973 | Collins ........................... 95/139 X |
| 3,865,924 | 2/1975 | Gidaspow et al. . |
| 3,885,927 | 5/1975 | Sherman . |
| 3,981,698 | 9/1976 | Leppard . |
| 4,039,620 | 8/1977 | Netteland et al. . |
| 4,433,981 | 2/1984 | Slaugh et al. . |
| 4,477,267 | 10/1984 | Reiss . |
| 4,493,715 | 1/1985 | Hogan et al. . |
| 4,711,645 | 12/1987 | Kumar . |
| 4,775,396 | 10/1988 | Rastelli . |
| 4,986,835 | 1/1991 | Uno . |
| 5,156,657 | 10/1992 | Jain et al. . |
| 5,173,462 | 12/1992 | Plee . |
| 5,203,887 | * 4/1993 | Toussaint ........................... 95/902 X |
| 5,531,808 | * 7/1996 | Ojo et al. ........................... 95/139 X |
| 5,587,003 | 12/1996 | Bulow et al. . |
| 5,674,311 | * 10/1997 | Notaro et al. ........................... 95/139 X |

FOREIGN PATENT DOCUMENTS

| 486 384 | 5/1992 | (EP) . |
| 519 073 | 12/1992 | (EP) . |
| 826 631 | 3/1998 | (EP) . |
| 1051621 | 3/1964 | (GB) . |
| 1508928 | 7/1976 | (GB) . |

OTHER PUBLICATIONS

Günter H. Kül, "Crystallization of Low–Silica Faujasite ($SiO_2/Al_2O_3$~2.0)", *Zeolites*, 1987, vol. 7, Sep., pp. 451–457.*

* cited by examiner

*Primary Examiner*—Robert H. Spitzer
(74) *Attorney, Agent, or Firm*—Scott R. Cox

(57) ABSTRACT

A molecular sieve adsorbent for the purification of gas streams containing water vapor and carbon dioxide and a process for its preparation. The adsorbent is a sodium form of a low-silica faujasite having a silica to alumina ratio of about 1.8:1 to about 2.2:1, a residual content of potassium ions less than about 8.0 percent (equiv.), a low content of crystalline and amorphous admixtures and crystal sizes generally within the range of 1–4 μm, blended with a binder.

25 Claims, 2 Drawing Sheets

MOLECULAR SIEVE ADSORBENT FOR GAS PURIFICATION AND PREPARATION THEREOF

TECHNICAL FIELD

The present invention relates to a novel adsorbent for removal of water and carbon dioxide from gases, and more particularly, an adsorbent for purification of air, nitrogen, hydrogen and natural gas streams. The invention is also a method of preparation of the adsorbent.

BACKGROUND ART

Carbon dioxide is an undesired impurity in many commercial gas applications owing to its ability to freeze and form hydrates with moisture at low temperatures. Formation of solids or solid particles makes gas processing, operation, transportation and storage quite difficult or even impossible. For example, cryogenic units for air separation to produce oxygen and nitrogen demand practically complete removal of carbon dioxide (1 ppm and less) and water vapor from air before separation. Refineries place similar requirements on the quantity of carbon dioxide and moisture present in hydrogen-contaminated gas flows. Similar requirements are placed on ammonia plants for nitrogen purity and gas processing plants on the carbon dioxide content and natural gas dew point prior to ethane and helium recovery and/or before natural gas liquefaction. Also, petrochemical plants have to eliminate carbon dioxide and water in monomers: ethylene, propylene, butadiene, etc. to prevent poisoning of the polymerization catalysts and deterioration of polymer properties.

Adsorption of carbon dioxide and water vapor is the most common method of removal of these compounds from gas streams due to high performance and relatively low capital and operational costs. Two adsorption techniques are commonly used in commercial gas manufacturing: temperature swing adsorption (TSA) and pressure swing adsorption (PSA). Efficiency of both adsorption processes is determined by the properties of the adsorbent. High adsorption of carbon dioxide is the most important property of the adsorbent, especially at very low partial pressures.

Several types of $CO_2$ adsorbents have been created to meet industry needs. Because general duty adsorbents, such as alumina, silica gel and activated carbon, do not have a substantial adsorption capacity for carbon dioxide, more complex adsorbents have been prepared.

U.S. Pat. No. 3,865,924, Gidaspow, discloses a carbon dioxide adsorbent, which constitutes a mechanical mixture of activated alumina and alkali metal carbonates. U.S. Pat. No. 4,433,981, Slaugh, discloses an adsorbent prepared by impregnating alumina with an alkali or alkaline earth metal oxide or salt decomposable upon calcination. U.S. Pat. No. 4,493,715, Hogan, discloses an adsorbent for carbon dioxide removal from olefins which comprises alkali metal oxides, hydroxides, nitrates, acetates, etc. placed on an activated alumina.

All such adsorbents employ chemisorption or reversible chemical reactions to bind carbon dioxide to the metal carbonates or bicarbonates. The main disadvantage of these adsorbents is low operational reliability and short life due to the tendency of active components to sinter. Secondly, the time before water breakthrough on the majority of adsorbents is shorter than the time before the carbon dioxide breakthrough. This results in the need to employ supplemental desiccant beds.

It is also impossible to use base-containing adsorbents in the PSA-type units because they form compounds with $CO_2$ that do not regenerate under reduced pressure.

A newer process for gas dehydration and carbon dioxide recovery technology uses molecular sieves, natural and synthetic zeolites. It is known that synthetic zeolite A and X types are effective adsorbents of $CO_2$ and water. For instance, U.S. Pat. No. 3,981,698, Leppard, U.S. Pat. No. 4,039,620, Netteland, U.S. Pat. No. 4,711,645, Kumar, U.S. Pat. No. 4,986,835, Uno, and U.S. Pat. No. 5,156,657, Ravi, suggest the use of standard molecular sieves 5A, 10A and 13X as carbon dioxide adsorbents. These molecular sieves adsorb $CO_2$ by physical adsorption and are regenerable at ambient temperatures. However, they do not possess sufficient adsorption capacity for carbon dioxide. Thus, such adsorbents cannot provide extensive gas purification, demand an increased loading volume and often require the use of supplemental adsorbent beds to decrease the water and carbon dioxide concentration prior to introduction into the zeolite bed.

To increase carbon dioxide adsorption capacity, several adsorbents have been proposed based on various cation exchanged forms of molecular sieve X and other crystalline structures. Thus, U.S. Pat. No. 3,885,927, Sherman, discloses a barium cation form of zeolite X in which 90–95% of the $Na^+$ ions are replaced by $Ba^{2+}$ ions. U.S. Pat. No. 4,477,267, Reiss, utilizes an adsorbent for hydrogen purification containing CaX-zeolite. For carbon dioxide removal, U.S. Pat. No. 4,775,396, Rastelli, describes the use of zinc, rare earth metals, a proton and ammonium cation exchanged forms of synthetic faujasite having a silica: alumina ratio in broad range of 2–100. U.S. Pat. No. 5,587,003, Bulow, discloses the use of a natural or synthetic clinoptilolite, which contains as exchangeable cation the ions of metals of Groups 1A, 2A, 3A, 3B, the lanthanide group and mixtures of these.

All of these molecular sieve adsorbents are characterized by carbon dioxide adsorption capacity extended at moderate and high partial pressures of the admixture to be adsorbed. However, their capacity to adsorb at low partial pressure of $CO_2$ (<5 torr) and at ambient temperatures is not sufficient to provide the purity of the gas required. In addition, due to the relatively short time before $CO_2$ breakthrough, the water capacity of these adsorbents appears to be only 10–15 percent of potential. This decreases adsorbent performance in such applications as TSA and PSA air pre-purification units where carbon dioxide inlet adsorption is very low. Employing the above mentioned adsorbents in such applications demands gas chilling to a temperature below about 5° C. In turn, this results in a substantial increase in operation and capital costs.

U.S. Pat. No. 5,531,808, Ojo, discloses an adsorbent for carbon dioxide adsorption comprising a type X zeolite having a silicon to aluminum ratio in the range of 1.0–1.15. The type X zeolite adsorbent contains ions of Group 1A, Group 2A, Group 3A, Group 3B, the lanthanide series and mixtures thereof. It fails to teach any critical quantitative relationship among various cations in the type X-zeolite crystalline structure that is necessary to provide high levels of adsorption capacity of carbon dioxide at low partial pressures and at ambient temperatures. It also fails to disclose preferable limits for crystalline purity and crystal sizes. It also does not disclose the adsorbent macroporosity limits necessary to provide the appropriate kinetics and dynamics of carbon dioxide adsorption.

A process for preparing low-silica faujasite (LSF) with a silica/alumina ratio ~2.0 is disclosed in Kuhl "Crystallization of Low-Silica Faujasite" Zeolites, vol. 7 p.451 (1987). Kuhl discloses that both sodium and potassium cations should be present to obtain faujasite crystals with relatively low silica content. The crystallization process disclosed comprises preparing a sodium aluminate water solution with addition of sodium and potassium hydroxides, mixing the solution with sodium silicate, aging the gelled mixture, and filtering and washing of the crystallization product. Kuhl also describes specific reagent ratios, temperatures and retention times, which are required for crystallization of the product. However, it does not specify the range of crystallization parameters that provide definite size of the faujasite crystals and a final product with a low content of admixture crystals of different types. Kuhl also does not disclose sodium-potassium ion exchange procedures for obtaining LSF with low residual potassium ion content.

A number of other patents disclose molecular sieve adsorbents having improved adsorption capacities, especially for the removal of carbon dioxide from gas mixtures. For example, U.S. Pat. No. 2,882,244, Milton, discloses a variety of crystalline aluminosilicates useful for $CO_2$ adsorption. U.S. Pat. No. 3,078,639, Milton, discloses a zeolite X useful for the adsorption of carbon dioxide from a gas stream. British Patent Nos. 1,508,928, Mobil Oil, and 1,051,621, Furtig et al., disclose faujasite-type zeolites having a silica to alumina ratio from 1.8 to 2.2.

While these products have been useful in the adsorption of carbon dioxide and water from gas streams, it is important to provide improved adsorbents. Further, while it has been discovered that low silica faujasites are useful in the adsorption of carbon dioxide and water from gas streams, newer low silica faujasites with improved adsorption capabilities which do not exhibit the limitations of the earlier products would be helpful.

Accordingly, it is an aspect of the invention to provide an adsorbent for carbon dioxide and water vapor with enhanced adsorption capacity.

It is a further aspect of the invention to provide an adsorbent for carbon dioxide useful for adsorption at ambient temperatures and low partial pressures.

It is a still further aspect of the invention to provide an adsorbent for carbon dioxide in a gas stream which reduces operation and capital expenses when used.

It is a still further aspect of the invention to provide an adsorbent for carbon dioxide and water vapor with improved kinetics and dynamics of adsorption for both Temperature Swing Adsorption processes and Pressure Swing Adsorption processes and an aggregate of the two processes.

It is a still further aspect of the invention to disclose an adsorbent for carbon dioxide which produces a gas stream containing less than one part per million of carbon dioxide.

It is a still further aspect of the invention to provide a process for the production of a low silica faujasite adsorbent for carbon dioxide.

These and further aspects of the invention will be apparent from the foregoing description of a preferred embodiment of the invention.

SUMMARY OF INVENTION

The present invention is an adsorbent for carbon dioxide, and preferably water vapor, from gas streams where the adsorbent exhibits high adsorption capacity at low partial pressures and ambient temperatures. The adsorbent comprises a sodium form of a low silica faujasite, wherein the silica to alumina ratio is from about 1.8:1 to about 2.2:1, preferably about 2.0:1 to about 2.1:1, and wherein the content of the potassium ions present in the low silica faujasite constitute less than about 8.0 percent, preferably less than about 2.5 percent, most preferably less than about 1.0 percent of the exchangeable cations (equivalents). Preferably, the volume of the macro-pores in the range from about 1,000 to about 10,000 Å radii is greater than about 0.4 $cm^3/g$, preferably from about 0.4 to about 0.6 $cm^3/g$ and most preferably from about 0.4 to about 0.5 $cm^3/g$.

The present invention also features a process for the production of the adsorbent product comprising preparing a sodium form of a low-silica faujasite, wherein the low-silica faujasite has a silica: alumina ratio of about 1.8:1 to about 2.2:1 and a residual content of potassium ions of less than about 8.0 percent (equiv.); blending the resultant product with a binder; forming the blended product into a shaped article; and drying and calcining the article to produce the adsorbent product.

DISCLOSURE OF THE INVENTION

Figure 1:
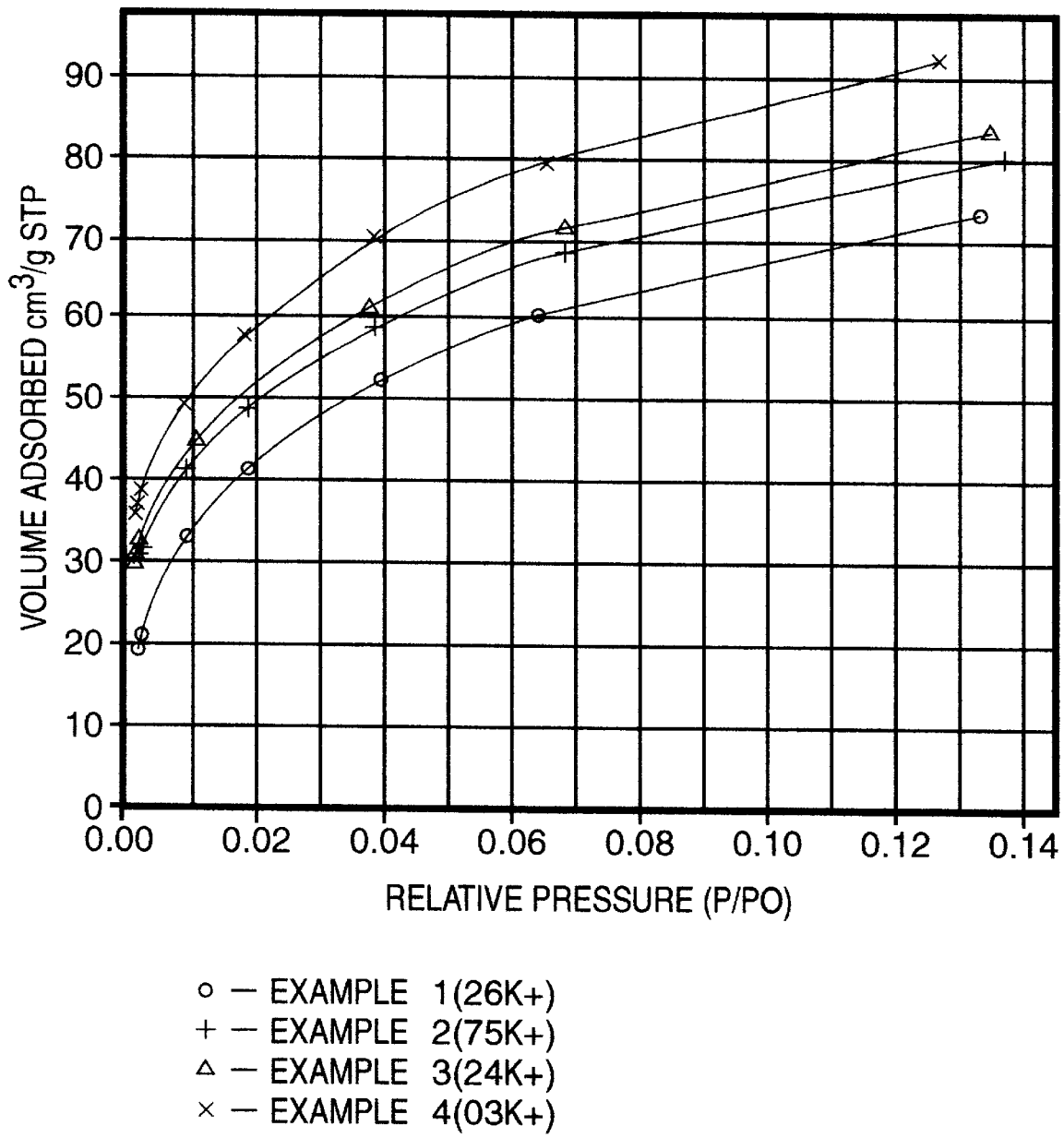
FIG. 1 shows the carbon dioxide adsorption isotherms for low-silica faujasites having differing percentages of residual potassium cations.

It is known to use low silica faujasites for the adsorption of carbon dioxide and water vapor from gas streams. It is also known that the substitution of sodium cations by other metal ions of larger size causes an increase in the adsorption capacity of standard faujasites with high silica content. For example, it is known that the calcium forms of a faujasite X zeolite having a silica/alumina ratio greater than 2.3:1 is characterized by higher adsorption capacities for carbon dioxide than sodium forms of these same faujasites.

Conventionally, low silica faujasite crystals are produced having a sodium: potassium ratio from about 2 to 3:8 to 7. It has been surprisingly discovered that by substituting sodium for substantially all of the potassium ions, the carbon dioxide adsorption capacity of the low silica faujasite increases significantly over conventional low silica faujasite with conventional ratios of sodium to potassium ions. It has also been surprisingly discovered that the fewer the potassium ions that are present in the low silica faujasite crystal structure and respectively, the more sodium ions that are present, the better the adsorption capacity for carbon dioxide of the adsorbent which is produced.

Previously, it had been discovered by Kuhl that the crystallization of low silica faujasite is typically accompanied by the formation of high silica faujasites, zeolite A, zeolite P, sodalite and other crystalline and amorphous admixtures. It has been discovered that in order to create improved adsorption capacity for the adsorbent, the impurities that are conventionally present in low silica faujasite should be reduced as much as possible. Thus, it is preferable that the low silica faujasite utilized as an adsorbent contain at least about 90 percent, by weight, of the low silica faujasites, preferably at least about 95 percent, by weight, and most preferably at least about 98 percent, by weight.

In addition, it has also been discovered that in order to increase the adsorption capacity of the high sodium, low silica faujasites, at least about 80 percent of the low-silica faujasite crystals, by weight, should have a crystal size within a range of about 1 to 4 $\mu$m, preferably 1 to 3 $\mu$m and most preferably 1 to 2 $\mu$m.

It has also been discovered that the volume of the macropores of a size with a radii from about 1,000 to 10,000 angstrom should be greater than about 0.4 cm$^3$/g, preferably from about 0.4 to about 0.6 cm$^3$/g and most preferably from about 0.4 to about 0.5 cm$^3$/g.

If these criteria for high sodium, low silica faujasites are satisfied, the adsorption capacity of the adsorbent is enhanced in dynamic conditions. Without utilizing these preferred embodiments for the high sodium, low silica faujasites, the carbon dioxide adsorption in a flow on a molecular sieve adsorbent is limited by mass transfer inside adsorbent granules. Thus, the large macropore volume is required to provide the carbon dioxide molecules fast diffusion from the external surface of the adsorbent granules to the external surface of the crystals. Whereas, small size of zeolite crystals diminishes resistance to superficial diffusion inside the microcrystals.

In addition, the enhanced carbon dioxide capacity of the adsorbent of the present invention also increases the water adsorption capacity of the adsorbent up to 40–50 percent over conventional carbon dioxide adsorbents.

Generally, high sodium, low silica faujasites are created by preparing a water solution of sodium aluminate, sodium silicate, and sodium and potassium hydroxide whose ratios are expressed as mixtures of oxides within the following range:

| | |
|---|---|
| $SiO_2:Al_2O_3$ | 1.9–2.2 |
| $(Na_2O + K_2O):SiO_2$ | 3.0–3.4 |
| $H_2O:(Na_2O + K_2O)$ | 15.5–17.5 |
| $Na_2O:(Na_2O + K_2O)$ | 0.72–0.78 |

The reaction mixture should be maintained at a temperature of about 850 to 95° C. over the reaction process of 2–10 hours. Additionally, to provide the narrow distribution of low silica faujasite microcrystals so that their sizes will be in the range of about 1 to 4 $\mu$m, preferably 1 to 3 $\mu$m and most preferably 1 to 2 $\mu$m, fine submicron powders of montmorillonite, such as Rym® Kill 10 MB, with particle size of 0.4–0.8 $\mu$m in a quantity of 0.6–1.5 percent, by weight should be introduced under intensive stirring into the reaction mixture after about 15 to 30 minutes. The composition is then stirred for at least about 2 hours and maintained at a temperature of about 85° to 95° C. during stirring. The crystals produced are filtered from the reaction solution. The crystals obtained from this reaction are then washed with deionized water to maintain the pH of the crystals in a range from about 10.5 to about 11.

Once these crystals are obtained, the potassium ion content of the low silica faujasites must be reduced to levels less than about 8 percent, preferably less than 2.5 percent, most preferably about 1.0 percent.

There are several methodologies that may be used to produce this type of high sodium, low silica faujasite. For example, a powder exchange can be performed on a belt filter with from one to three stages of sodium chloride solution feed. The concentration of the sodium chloride solution should be increased in each stage so that the equivalent ratio of sodium in solution to potassium in zeolite reaches 1.5 during the first stage, 2.2 during the second stage, and 3.0 during the third stage.

In an alternative method, calcined sodium/potassium, low silica faujasite beads can be ion exchanged in a column with a sodium chloride solution (10–15 percent by weight) or preferably with a sodium chloride plus sodium hydroxide solution (7–10 percent NaCl+3–5 percent NaOH), by weight, at a temperature of about 600 to 85° C. In either process, the ion exchanged product is washed with deionized water to remove excess sodium ion. Both of these processes produce adsorbents with a potassium content of less than about 8.0 percent, preferably less than about 2.5 percent, and most preferably, less than about 1.0 percent (equiv.).

The high sodium, low silica faujasite zeolite powder obtained is then admixed with a binder to produce a final adsorbent product. The binder can be chosen from mineral or synthetic materials, such as clays (kaolinite, bentonite, montmorillonite, attapulgite or other such clay materials), silica, alumina, alumina hydrate (pseudoboehmite), alumina trihydrate, alumosilicates, cements or other such materials. The binder comprises about 15–40 percent by weight of the final adsorbent. The mixture is then kneaded with 18–35 percent, by weight, water to form a paste which is then aggregated to form shaped articles of conventional shapes.

In a preferred embodiment certain peptizers and/or pore-forming ingredients are aggregated with the molecular sieve product and/or with the binder in an amount from about 0.5 to about 2.0 percent of the final adsorbent product by weight to produce the extended macropore volume required. Such additives typically include mineral acids, surfactants and plasticizers such as, for example, polyalkeneglycols, polyacrylamides, polycarboxylates, natural organic products such as starches, molasses, lignin or other such related material. Following this addition, the shaped product is cured, dried and calcined at a temperature from about 550° C. to about 650° C.

Utilizing high sodium, low silica faujasite particles produced by the above-described process creates a product which is particularly useful for the adsorption of carbon dioxide and water vapor from gas streams. The preferred types of gas streams in which this type of high sodium, low silica faujasite crystals can be utilized includes air, nitrogen, hydrogen, natural gas, individual hydrocarbons and monomers, such as ethylene, propylene, 1.3 butadiene, isoprene and other such gas systems.

It has been surprisingly discovered that high sodium, low silica faujasite with a potassium content less than about 2.5 percent (equiv.), when utilized in a conventional air pre-purification process, reduces the carbon dioxide level in the gas stream generally to a range of 0.3 ppm to about 0.5 ppm which is significantly lower over the same length of the adsorbent bed than that of conventional low silica faujasites with a sodium content of about 62 percent to about 90 percent (equiv.). These conventional low silica faujasites reduce the $CO_2$ content only to about 2 ppm. Simultaneously the dynamic adsorption capacity of the high sodium, low silica faujasite for water is also increased from about 1.5 percent up to about 3.5 percent (by weight). Therefore, it has been surprisingly discovered that low silica faujasites with a potassium content less than about 8.0 percent (equivalent), preferably less than 2.5 percent (equivalent), and most preferably, less than about 1.0 percent (equivalent) are highly efficient in the adsorption of both carbon dioxide and water vapor in conventional gas stream operations.

In order to illustrate the present invention and the advantages thereof, the following examples are provided. It is understood that these examples are illustrative and do not provide any limitation on the invention.

EXAMPLE 1

16.8 1 of sodium hydroxide and 8.9 1 of potassium hydroxide with a molar ratio of $Na_2O$: ($Na_2O+K_2O$) equaling 0.75 were added to 20 liters of a sodium aluminate solution so that the ($Na_2O+K_2O$): $Al_2O_3$ ratio equals 1.62. This solution was mixed with 16.5 l of a sodium silicate solution in such quantitative relation to provide a silica/alumina ratio of 2.0 wherein the sum of moles of water to the alkali metal oxides equals 16.4. The gelled mixture obtained was aged for 1 hour and crystallized at 92° C. for 4 hours. After 18 minutes of thermotreating, a fine montmorillonite powder (Rym® Kill 10 MB with particle size of 0.4–0.8 $\mu$m) was added in an amount equal to 0.6 percent of the final product weight. The crystals produced were filtered and washed with deionized water to reduce the pH of the product produced to about 10.6.

The product was analyzed and found to contain low silica faujasite crystals of 98 percent purity (X-ray analysis). The crystal size of the product under electron microscopy analysis was determined to be from 1–3 $\mu$m. The product had a potassium ion content of about 26 percent (equivalent). A paste was formed and dried at 110° C. for 3 hours.

8 kg of this dried powder was mixed with 2.0 kg of attapulgite Minugel 400, moisturized and formed into beads of about 1.6 mm diameter by means of plant plate granulator. The beads were then dried at 110° C. for 2 hours and calcined first at 250° C. for 2 hours, then at 350° C. for 2 hours and at 600° C. for 1 hour.

EXAMPLE 2 (the Invention)

4.0 kg. of the sodium/potassium low silica faujasite beads obtained from Example 1 were treated at ambient temperature with 16 liters of a 1.5N solution of sodium chloride. The product was washed with 80 l of deionized water and then again treated with 8 liters of 2.2N solution of sodium chloride. The product was then washed with deionized water to remove the chloride ions until a negative measurement with a 0.028N solution of silver nitrate. Then the operating procedure of the Example 1 for the adsorbent drying and calcining was repeated. Elemental analysis of the resulting product showed a 7.5 percent (Equiv.) residual potassium ion content. The analysis was done by Inductively Coupled Plasma Atomic Emission Spectroscopy.

EXAMPLE 3 (the Invention)

2.3 kg. of the beads produced from Example 2 were treated under ion exchange conditions with 8 liters of a 3.0N solution of sodium chloride at ambient temperature. The product obtained was washed with deionized water as it is shown in Example 2. Then the operating procedure of the Example 1 for drying and calcining was repeated. The product produced from this exchange operation was analyzed for potassium and determined to have a potassium content of 2.4 percent (equiv.).

EXAMPLE 4 (the Invention)

1.0 kg. of the beads prepared in Example 3 were treated at a temperature of 80° C. with 2 liters of 3.0N solution of sodium chloride. The operating procedure of Example 2 for the adsorbent washing, drying and calcining was repeated. The residual content of the potassium ion in the adsorbent was 0.3 percent (equiv.).

EXAMPLE 5 (Adsorption Equilibrium Test)

The samples of Examples 1 through 4 were tested for carbon dioxide adsorption equilibrium. Adsorption isotherms were measured employing an adsorption volumetric unit Micromeritics ASAP 2010 at a temperature of 25° C. The samples were activated preliminarily at 400° C. for 2 hours. The carbon dioxide partial pressure varied in the range of 1–100 torr.

The results obtained are shown in FIG. 1.

As is apparent from FIG. 1, the residual content of potassium ion in the low-silica faujasite has a dramatic impact on the ability of each of these adsorbents to adsorb carbon dioxide. This Figure shows that the less potassium ions that are present, the higher the equilibrium adsorption capacity for carbon dioxide over its full range of partial pressures. This Figure also confirms that only adsorbents having a potassium content of less than about 8.0 percent (equiv.) provide a satisfactory adsorption capacity and ambient temperature and low partial pressures (1–10 torr.). The adsorbents, according to the present invention (Examples 2 to 4), display adsorption capacity well above that of the adsorbent according to U.S. Pat. No. 5,531,808 (Example 1) which include comparable amounts of both alkali metal ions: sodium and potassium.

EXAMPLE 6 (Comparative)

The operating procedure of Example 1 for low silica faujasite synthesis was repeated with one modification. Sodium and potassium hydroxide solutions were used so that the final $Na_2O$: ($Na_2O+K_2O$) had a ratio of 0.72. The product produced contained 86 percent of a low silica faujasite under X-ray diffraction. The XRD and chemical analyses of the product showed significant amounts (~12 percent) of high silica faujasite and zeolite A. The powder obtained from this procedure was exchanged three times with a sodium chloride solution as described in Example 3. The potassium percentage in the exchange product was 2.2 percent (equiv.). The operating procedure of Example 1 for mixing the product with an attapulgite binder to form beads was repeated.

EXAMPLE 7

Adsorption Equilibrium Test

The adsorbent samples of Examples 3 and 6 were tested for carbon dioxide adsorption at partial pressures of 2, 5, 8 and 15 torr. In the process, the testing procedure of Example 5 was employed. The results are reported in Table 1.

TABLE 1

| Examples | LSF purity % | Adsorption Value, $cm^3$/g Partial Pressure, torr | | | |
|---|---|---|---|---|---|
| | | 2.0 | 8.0 | 15.0 | 30.0 |
| 3 | 98 | 32.6 | 44.8 | 51.3 | 61.4 |
| 6 | 86 | 26.5 | 41.8 | 50.2 | 61.6 |

As in Example 7, the adsorbent according to the present invention, having low silica faujasite of high purity, 98 percent, demonstrates a higher adsorption capacity at low partial pressures (2–10 torr) of carbon dioxide than that of the adsorbent with lower LSF purity.

EXAMPLE 8 (Comparative)

The operating procedure for the low silica faujasite synthesis of Example 1 was repeated with one exception: the montmorillonite powder was not added to the gelled crystallizing mixture. The adsorbent, so prepared, contained low silica faujasite crystals of 4–6 $\mu$m size. The beads, produced with 20 percent of attapulgite were ion-exchanged with NaCl solution using the same procedure as shown in Example 3.

EXAMPLE 9

Test of Dynamic Capacity

The adsorbents of Examples 3 and 8 were tested for dynamic adsorption in air purification employing a tube adsorber with adsorbent bed volume of 100 cm$^3$/g at a temperature of 25° C. Air, having a 6 percent relative humidity and containing 340 ppm of $CO_2$ was fed through the adsorption unit at the linear velocity of 0.1 m/sec. Breakthrough concentrations were assumed: for water –0.1 ppm, for carbon dioxide –1 ppm. All measurements were carried out up to the first component breakthrough. Thus, the water capacity is determined taking into account the time before carbon dioxide breakthrough occurs.

The results for dynamic water and carbon dioxide capacity of the samples tested are reported in Table 2.

TABLE 2

| Example | Crystal Size, μm | Potassium Content, % equiv. | Dynamic Capacity, % w. Water | Dynamic Capacity, % w. Carbon Dioxide |
|---|---|---|---|---|
| 3 | 1–3 | 2.4 | 3.30 | 0.66 |
| 8 | 4–6 | 2.2 | 2.84 | 0.54 |

As in Example 9, the adsorbent, according to the present invention, having crystal sizes predominantly in the range of 1–3 μm, with other similar characteristics, demonstrated substantially higher dynamic capacity for both impurities recovered than the adsorbent with conventional 4–6 μm crystal size.

EXAMPLE 10 (Comparative)

4 kg of low-silica faujasite powder from Example 1, was exchanged with 2.2 N and 3.0 N solutions of NaCl as described in Examples 2 and 3. 0.8 kg of the product produced having residual content of K$^+$ ions of 2.5 percent (equiv.) was added to 0.2 kg of attapulgite, Minugel 400, in a worm disintegrator, Strand F4, for 1 hour. The homogenous blend obtained was mixed with 280 ml of water and the resulting paste was extruded through a spinneret to produce extrudates with a diameter of 1.6 mm. The extrudates were cured at ambient temperature for 24 hours, dried at 110° C. for 2 hours and calcined at 250° C., 350° C. and 600° C. for 1 hour at each temperature.

The products produced had a macropore (1000–10000 Å) volume equal to 0.34 cm$^3$/g., according to mercury porosimetry evaluation.

EXAMPLE 11 (According to the Invention)

The operating procedure of Example 10 was repeated except the low silica faujasite-attapulgite blend was mixed with 220 ml of a 5 percent water solution of polyacrylamide 1500. The procedures for extrusion, extrudate drying and calcination from Example 10 were repeated.

The product produced had a macropore volume (1000–10000 Å) of 0.43 cm$^3$/g.

EXAMPLES 12 and 13 (Comparative)

Low potassium, low silica faujasite powder from Example 10 was extruded through a spinneret (1.6 mm diameter) with 20 percent of kaolin Sperse 100, by weight (Example 12) and 20 percent of activated alumina binders, by weight (Example 13). Binders were peptized preliminarily with 1.5 percent of poly-(2-carboxyethyl)-acrylate 170 based on binder content. The remaining extrusion, extrudate drying and calcination procedures were the same as shown in Example 10.

The adsorbents produced had macropore volume (1000–10000 Å):

Example 12—0.39 cm$^3$/g;

Example 13—0.36 cm$^3$/g.

EXAMPLE 14 (According to the Invention)

Activated alumina AP-22 from Porocel, having surface area of 270 m$^2$/g and median particle size of 6 μm, was used as a binder. 0.2 kg of the binder was treated with 1 percent of ammonium polycarboxylate 40 and added to 0.8 kg of low potassium, low silica faujasite powder from Example 10. The blend was extruded, dried and calcined in the same manner as in Example 10.

A macropore volume of 0.47 cm$^3$/g characterized the product produced.

EXAMPLE 15

Equilibrium and Dynamic Capacity Test

The adsorbents of Examples 10 to 14 were tested for equilibrium and dynamic adsorption capacity. Carbon dioxide equilibrium adsorption value was measured at 25° C. and $CO_2$ partial pressure 1.8 torr employing the instrumentation and method described in Example 5. Water and carbon dioxide dynamic capacities were measured by means of the testing procedure of Example 9.

The results are reported in Table 3.

TABLE 3

| | | ADSORPTION CAPACITY | | | |
|---|---|---|---|---|---|
| | Macropore | Equilibrium | | Dynamic | |
| | Volume, | Carbon Dioxide | Water | Carbon Dioxide | |
| Example | cm$^3$/g | mmol/g | % w. | % w. | cm$^3$/g | % w. |
| 10 | 0.34 | 1.33 | 5.9 | 2.48 | 2.47 | 0.49 |
| 11 | 0.43 | 1.29 | 5.7 | 3.42 | 3.42 | 0.68 |
| 12 | 0.39 | 1.34 | 5.9 | 3.09 | 3.07 | 0.61 |
| 13 | 0.36 | 1.32 | 5.8 | 3.16 | 2.66 | 0.53 |
| 14 | 0.47 | 1.34 | 5.9 | 3.48 | 3.65 | 0.72 |

Table 3 shows that regardless of the type and chemical composition of the binder, the adsorbent dynamic capacity is controlled by its macroporosity. The larger the macropore volume, the higher the dynamic capacity for adsorption of carbon dioxide. Due to enhanced carbon dioxide adsorption capacity, the adsorbents are capable of adsorbing significant quantities of water vapor before $CO_2$ breakthrough. This leads to an increase of the dynamic water capacity up to 40–50% from potential.

As is apparent, the efficiency of the adsorbents, according to the present invention, is 45 percent better than the prior art adsorbent performance. Contrary to the prior art, the present invention adsorbents can be employed in PSA and TSA units independently, without a supplemental desiccant bed.

EXAMPLE 16 (Comparative)

This Example compares calcium-exchanged sodium LSF adsorbents with those of the invention. Carbon dioxide adsorption ability of Group 2A forms of low-silica faujasite as claimed in U.S. Pat. No 5,531,808 was compared with adsorbents of the present invention.

0.5 kg of the sodium low silica faujasite beads from Example 4, having 0.3 percent of residual potassium ions, were exchanged with 5 l of 1N solution of calcium chloride at ambient temperature. The ICP analysis showed that final product contained: $Ca^{2+}$—65 percent, $Na^+$—35 percent and $K^+$—0.16 percent.

EXAMPLE 17

Isotherm Adsorption Test

The adsorbent of Example 16 as well as other conventional adsorbents, standard molecular sieves 5A (U.S. Pat. No. 3,981,698), 10A (U.S. Pat. No. 4,986,835) and 13X (U.S. Pat. No. 5,156,657) were tested in a carbon dioxide adsorption equilibrium. The adsorbent according to the present invention of Example 4 was also tested. Isotherms of adsorption were measured employing the instrumentation and procedure of Example 5.

Figure 2:
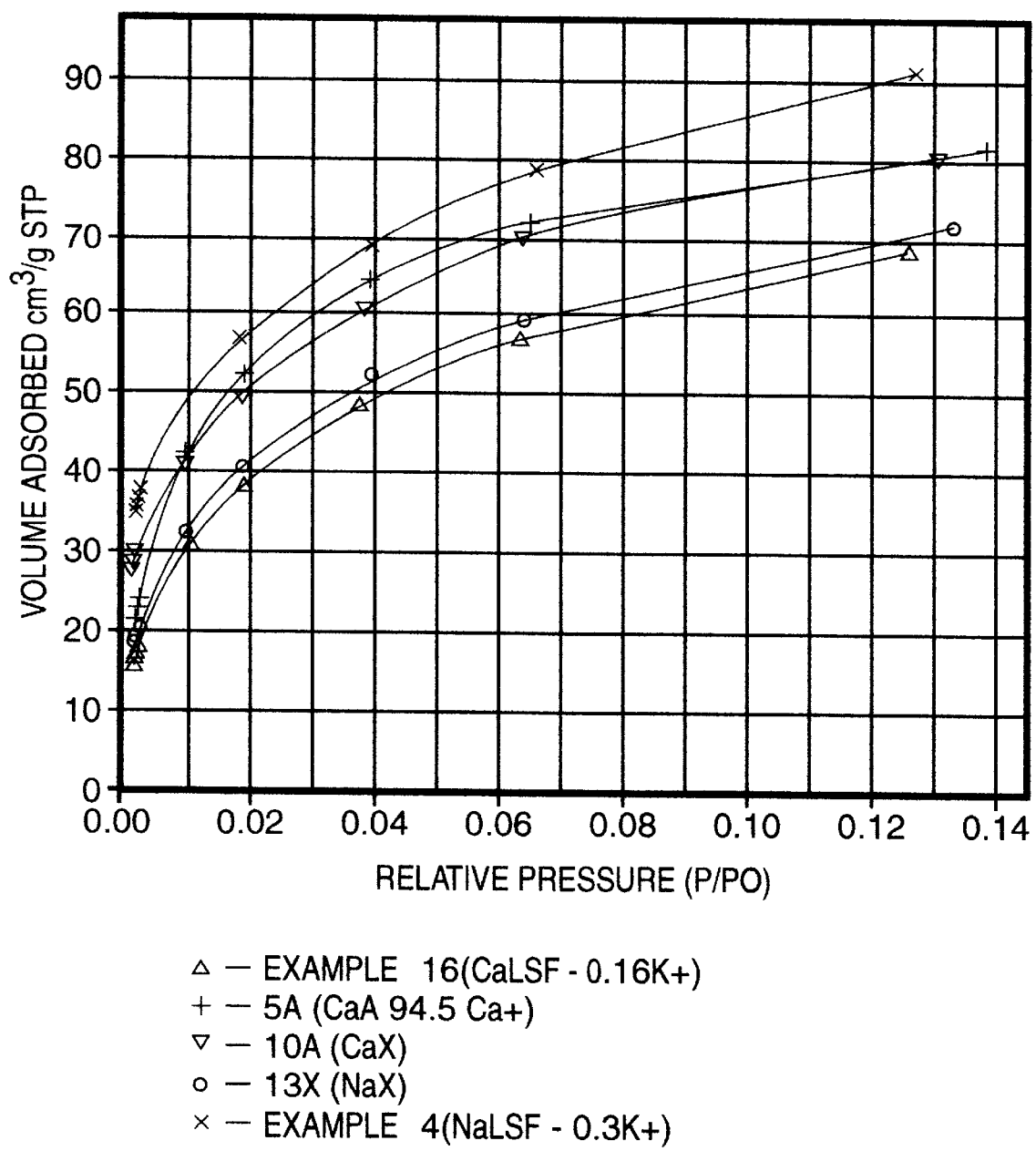
FIG. 2 compares the carbon dioxide adsorption of various adsorbents including the present invention (Example 4) and other adsorbents, including a molecular sieve 5A (CaA-94.5 percent $Ca^+$), molecular sieve 10A (CaX), molecular sieve 13X (NaX) and Example 16 showing a calcium low-silica faujasite with a potassium ion content of 0.16 percent.

The results obtained are reported in FIG. 2.

It is clear from FIG. 2 that the adsorbent of the present invention displays carbon dioxide adsorption capability well above prior art adsorbents. This improvement is shown over the full range of carbon dioxide partial pressures including very low pressures. The results also show that the substitution of sodium cations in the low-silica faujasite structure by larger calcium cations leads to an appreciable loss of adsorption capacity.

EXAMPLE 18

Dynamic Capacity Test

The adsorbents of Examples 14 and 16 along with the prior art adsorbents: molecular sieves 5A, 10A and 13X were tested in air purification for water and carbon dioxide adsorption. The technique and method of Example 9 were employed. The results are reported in Table 4.

TABLE 4

| Example | Molecular Sieve | DYNAMIC CAPACITY, % | |
|---|---|---|---|
| | | Water | Carbon Dioxide |
| 14 | NaLSF (0.3% $K^+$) | 3.48 | 0.72 |
| 16 | CaNaLSF (65% $Ca^{2+}$) | 1.52 | 0.39 |
| | 5A (94.8% $Ca^{2+}$) | 2.40 | 0.46 |
| | 10A (CaX) | 1.64 | 0.41 |
| | 13X (NaX) | 1.43 | 0.37 |

The adsorbents, according to the present invention, in comparison to previous adsorbents, display a superior performance in the dynamic process of air purification. Their capacity for water vapor and carbon dioxide adsorption of 1.7–2.0 times exceeds the adsorption characteristics of conventional adsorbents. As in Example 15, the results of Table 4 confirm that the adsorbent, according to the invention, provides reliable and extensive purification of gases without the use of a supplemental desiccant bed. This provides an opportunity for a substantial decrease in capital investments and operational costs using the present adsorbent in commercial PSA and TSA gas purification units.

Accordingly, the invention provides a highly effective, reliable and simple adsorbent for carbon dioxide and water vapor that can be used in TSA and/or PSA gas purification plants to increase commercial performance. The adsorbent can be used at new or existing plants. Furthermore, the combination of high sodium, low-silica faujasite with very low content of residual potassium ions has a number of advantages:

(1) it provides a high level of carbon dioxide and water vapor adsorption for gas purification;

(2) it allows the effective adsorption of carbon dioxide at ambient temperatures and low partial pressures of carbon dioxide that reduces capital and operation costs in air pre-purification and inorganic gas manufacturing;

(3) it provides satisfactory dynamics for both Pressure Swing Adsorption and Temperature Swing Adsorption processes;

(4) it allows gas purification units in one bed without the supplemental use of desiccants, such as silica gel, activated alumina, molecular sieves 3A, 4A, etc.

(5) it provides reliable and efficient technology for adsorbent preparation and manufacturing.

The adsorbent can be formed as spheres, beads, cylinders, extrudates, pellets, granules, rings, multileaves, honeycomb or in monolith form.

While the invention has been described in terms of various preferred embodiments, these should not be construed as limitations on the scope of the invention. Many other variations, modifications, substitutions and changes may be made without departing from the spirit thereof.

We claim:

1. A molecular sieve adsorbent for gas purification which comprises a sodium form of low-silica faujasite, having a silica: alumina ratio of about 1.8–2.2 with a residual content of potassium ions less than about 8.0 percent (equiv.), and a binder, wherein at least about 80% of said low-silica faujasite, by weight, has a crystal size in the range of 1–4 $\mu$m and wherein the adsorbent has a volume of macropores with a radius from about 1000 to 10,000 Å of at least about 0.4 $cm^3/g$.

2. The molecular sieve adsorbent of claim 1 wherein the silica to alumina ratio is about 2.0 to about 2.2.

3. The molecular sieve adsorbent of claim 1 wherein the silica to alumina ratio is about 2.0 to about 2.1.

4. The molecular sieve adsorbent of claim 1 wherein the residual content of potassium ions is less than about 2.5 percent (equiv.).

5. The molecular sieve adsorbent of claim 1 wherein the residual content of potassium ions is less than about 1.0 percent (equiv.).

6. The molecular sieve adsorbent of claim 1 wherein the low silica faujasite comprises from about 60 to about 85 percent and the binder comprises from about 15 to about 40 percent of the adsorbent.

7. The adsorbent of claim 1 wherein the low-silica faujasite comprises less than 10.0 percent by weight zeolite A, high silica faujasite X and other crystalline and amorphous admixtures.

8. The adsorbent of claim 1 wherein the low-silica faujasite comprises of less than 2.0 percent by weight zeolite A, high silica faujasite X and other crystalline and amorphous admixtures.

9. The adsorbent of claim 1, wherein the low-silica faujasite has crystal sizes, wherein the crystal size of at least about 80 percent of the faujasite is in the range of about 1–3 $\mu$m.

10. The adsorbent of claim 1, wherein the low-silica faujasite has crystal sizes, wherein the crystal size of at least about 80 percent of the faujasite is in the range of about 1–2 $\mu$m.

11. The adsorbent of claim 1, wherein the binder is selected from the group consisting of kaolinite, bentonite, montmorillonite, and attapulgite clays, silica, alumina, alumosilicates, and cements.

12. The adsorbent of claim 1, wherein the adsorbent has a volume of macropores with a radius from about 1000 to 10000 Å from about 0.4 to about 0.5 cm$^3$/g.

13. A process for the adsorption of carbon dioxide and water from a gas stream comprising passing the gas stream containing carbon dioxide and water over the molecular sieve adsorbent of claim 1, whereby substantial quantities of the carbon dioxide and water are adsorbed by the molecular sieve adsorbent.

14. A process for the production of a molecular sieve adsorbent comprising preparing a sodium form of a low-silica faujasite, wherein the low-silica faujasite has a silica: alumina ratio of about 1.8 to about 2.2 and a residual content of potassium ions less than about 8.0 percent (equiv.);

blending the resultant product with a binder and a peptizer, where in the blended product has a volume of macropores with a radius from about 1000 to 10000 Å of at least about 0.4 cm$^3$/g;

forming the blended product into a shaped article; and drying and calcining the article to produce the adsorbent product.

15. The process of claim 14 wherein the low-silica faujasite is prepared by mixing sodium aluminate, sodium silicate and sodium and potassium hydroxide, wherein the ratio of the components expressed as mixtures of oxide are within the following ranges:

| | |
|---|---|
| $SiO_2:Al_2O_3$ | 1.9–2.2 |
| $(Na_2O + K_2O):SiO_2$ | 3.0–3.4 |
| $H_2O:(Na_2O + K_2O)$ | 15.5–17.5 |
| $Na_2O:(Na_2O + K_2O)$ | 0.72–0.78. |

16. The process of claim 14 further comprising mixing a powder of montmorillonite in the amount of about 0.6 to about 1.5 percent, based on the final weight of the reaction product, with the prepared low-silica faujasite into a reaction mixture under intensive stirring for out 15 to 30 minutes, wherein the montmorillonite powder has a particle size of 0.4 to 0.8 μm and wherein the low-silica faujasite has a crystal-size in the range of about 1 to 4 μm.

17. The process of claim 14 further comprising ion exchanging the prepared, sodium form of low-silica faujasite with a sodium chloride solution.

18. The process of claim 17 wherein the sodium form of low silica faujasite is ion exchanged from about 1 to about 3 times.

19. The process of claim 17 wherein the sodium form of low silica faujasite is ion exchanged at a temperature from about 60° C. to about 85° C.

20. The process of claim 14 further comprising ion exchanging the prepared, sodium form of low-silica faujasite with a solution comprising sodium chloride and sodium hydroxide.

21. The process of claim 14 further comprising treating the prepared sodium form of low-silica faujasite and binder with a pore-forming additive.

22. The process of claim 21 wherein the pore-forming additive is selected from the group consisting of synthetic and natural materials including mineral acids, polyalkeneglycols, polyacrylamides, polycarboxylates, starch, molasses and lignin.

23. The process of claim 21 wherein the peptizer and pore-forming additives comprise from about 0.5 to about 2.0 percent of the adsorbent product, based on a total weight of the adsorbent product.

24. The process of claim 14 further comprising blending the low-silica faujasite with the peptizer.

25. The process of claim 14 further comprising blending the binder with the peptizer.

* * * * *